United States Patent [19]

Rise

[11] Patent Number: 4,461,381

[45] Date of Patent: Jul. 24, 1984

[54] ELEVATOR/LOWERATOR

[75] Inventor: William E. Rise, Utica, Mich.

[73] Assignee: Android Corporation, Auburn Hts., Mich.

[21] Appl. No.: 361,712

[22] Filed: Mar. 25, 1982

[51] Int. Cl.³ .................................. B65G 25/02
[52] U.S. Cl. ................................ 198/773; 198/774
[58] Field of Search .................. 198/774, 773, 488

[56] References Cited

U.S. PATENT DOCUMENTS 3,187,883 6/1965 Umbricht .................. 198/774
3,385,419 5/1968 Broser ..................... 198/773 X
4,027,767 6/1977 Gluck ..................... 198/488 X

FOREIGN PATENT DOCUMENTS

441017 12/1974 U.S.S.R. .................... 198/488

Primary Examiner—Joseph E. Valenza
Assistant Examiner—Donald W. Underwood
Attorney, Agent, or Firm—Stephenson & Boller

[57] ABSTRACT

A work transfer device for vertically transferring workpieces by means of a vertically disposed transfer bar. The transfer bar executes a motion which is somewhat in the shape of an hourglass for transferring articles one station at a time between vertically spaced stations. The articles may be transferred either upwardly or downwardly by simply reversing the direction of the drive. The drive for the transfer bar comprises a mechanism including cams and linkages for developing the hourglass type motion.

24 Claims, 11 Drawing Figures

ELEVATOR/LOWERATOR

BACKGROUND AND SUMMARY OF THE INVENTION

This invention relates to work transfer devices which transfer articles or workpieces in a vertical sense.

Manufacturing operations, particularly mass production operations, typically utilize powered transfer devices for advancing workpieces in process along the manufacturing line. Often the workpieces must be vertically transferred as a part of the work flow, either upwardly or downwardly. In the case of downward transfer, gravity may be used in some situations. Other downward transfers, and of course upward transfers, require a powered transfer device.

Heretofore, devices such as elevating chain conveyors have been used when vertical transfer is required. These devices comprise one or more endless chains operating on vertically spaced sprockets with one or more of the sprockets being driven by a source of power. Buckets or platforms are connected to the chains at selected spacings, and the workpieces are carried by the buckets or platforms. The chains are operated either continuously or by indexing. Because an endless chain itself revolves 360° as it travels once around its path of travel, special connections of the buckets or platforms to the chains may be required if 360° revolution of the buckets or platforms themselves is deemed objectionable. While chain type devices are generally recognized to be cost-competitive as far as initial sales price is concerned, special features, such as these special connections for example, contribute to their cost. There are the further costs which are not recognized in the sales price, and these are the operational costs involved with use of such chain type devices. The problems of chain type devices are well-known to those familiar with them and it is these which constitute the operational costs. Chain type devices are also not readily adaptable to different elevating heights. Yet, despite the disadvantages which are seemingly inherent in chain type devices, they continue to enjoy popularity due to the competitiveness of their initial sales price.

In other instances, other types of vertical transfer devices are used. An example of another type is a power cylinder elevator where a power cylinder is disposed at the bottom a stack of articles. The stack is confined within a vertical guide, and pivotally mounted stops are mounted on the guide at vertically spaced locations. When the cylinder is operated to push the stack upwardly, the stops pivot out of the way allowing the stack to advance upwardly. Once an article clears a stop, the stop pivots back into the path of the stack so that the article which has just cleared it cannot fall back. When the cylinder retracts, the stops support the articles in their new positions, and a new article is loaded at the bottom of the stack. When the cylinder is again advanced, it engages the newly loaded article to elevate the stack. The problem with this type of device is that the stack must always be full if the entire stack is to be elevated; in other words, an article at the most downstream point will not be advanced or unloaded, unless the underlying stack is full. Another disadvantage with this type of device is that only certain types of articles are suitable for this type of transfer. It is also impossible to use it for lowering articles.

The present invention is directed to a new and improved work transfer device for vertically transferring workpieces or articles. Not only does the invention avoid the problems which are seemingly inherent in chain type devices, but it is also surprisingly cost-competitive with them. The invention may be used with various types of workpieces, and it may be operated bi-directionally (i.e., either upwardly or downwardly) by merely reversing the direction of the drive. It can be adapted to operate over large distances without major modification, a feat which can be accomplished by a chain type device, if at all, only through more substantial modifications. Thus, the invention is seen to represent a significant improvement over presently available devices.

Briefly, the present invention, in its preferred embodiment, comprises a plurality of vertically spaced stations supported on a base. Workpieces are progressively advanced from station to station by a vertically disposed transfer bar. The transfer bar has work holders at vertical spacings corresponding to the spacing of the stations. A drive for the transfer bar is adjacent the stations and causes the transfer bar to repeatedly execute an operating cycle whereby the workpieces are advanced one station per cycle. Unique motion is imparted to the transfer bar comprising (1) an initial vertical upward component of motion wherein the work holders on the transfer bar lift the workpieces off the stations followed by, (2) a first horizontal component of motion to vertically clear the workpieces of the stations and (3) a second horizontal component of motion to vertically realign the workpieces with the stations including (4) during the time between the beginning of the first horizontal component of motion and the end of the second horizontal component of motion a vertical component of motion which vertically advances the workpieces so that the end of the second horizontal component of motion the workpieces are directly over their next stations followed by, (5) a downward vertical component of motion wherein the workpieces are deposited on these next stations, followed by, (6) a third horizontal component of motion to vertically clear the transfer bar work holders of the workpieces and (7) a fourth horizontal component of motion to vertically realign the transfer bar work holders with the workpieces including (8) during the time between the beginning of the third horizontal component of motion and the end of the fourth horizontal component of motion a vertical component of motion which vertically retracts the transfer bar so that at the end of the fourth horizontal component of motion the transfer bar is in position where it is poised to begin the initial vertical upward component of motion of the next operating cycle.

When the direction of advance is upward, the vertical component of motion which occurs between the beginning of the first horizontal component of motion and the end of the second horizontal component of motion is executed concurrently with the first horizontal component of motion so that the resultant motion is in a straight line with the workpieces vertically advancing and clearing the stations. The second horizontal component of motion is executed without any accompanying vertical motion to bring the workpieces into vertical realignment with and overlying the stations. The downward vertical component of motion is then executed depositing the workpieces on the stations. The vertical component of motion which occurs between the beginning of the third horizontal component of motion and the end of the fourth horizontal component of motion is executed concurrently with the third horizontal component of motion so that the resultant motion is in a straight line with the empty workholders on the transfer bar vertically retracting and clearing the workpieces which are supported on the stations. The fourth horizontal component of motion is executed without any accompanying vertical motion to bring the transfer bar work holders into vertical realignment with and underlying the stations so that the transfer bar work holders are poised to pick up the workpieces during the initial vertical upward component of motion of the next operating cycle.

When the direction of advance is downward, the first horizontal component of motion is executed without any accompanying vertical motion whereby the workpieces supported on the transfer bar work holders vertically clear the stations. The vertical component of motion which occurs between the beginning of the first horizontal component of motion and the end of the second horizontal component of motion is executed concurrently with the second horizontal component of motion so that the resultant motion is in a straight line which transfers the workpieces into vertical realignment with and overlying the stations. The ensuing downward vertical component of motion deposits the workpieces on the next stations and is sufficient to clear the transfer bar work holders of the workpieces after the workpieces have been deposited on the stations. The third horizontal component of motion is executed without any accompanying vertical motion to vertically clear the transfer bar work holders of the stations and workpieces. The vertical component of motion which occurs between the beginning of the third horizontal component of motion and the end of the fourth horizontal component of motion is executed concurrently with the fourth horizontal component of motion so that the resultant motion is in a straight line terminating with the transfer bar work holders poised directly beneath the workpieces in position to lift the workpieces from the stations upon the first vertical upward component of motion of the next cycle.

In the preferred embodiment, motion is imparted to the transfer bar by means of a mechanical drive. The mechanical drive comprises horizontally disposed members extending from the drive and connected to the transfer bar. Horizontal and vertical components of motion are generated and transmitted to the transfer bar through at least one of these members. The vertical component of motion is developed from a vertical barrel cam and the horizontal components of motion from a horizontal barrel cam. The two barrel cams are coaxial and are driven in unison with 360° rotation of the barrel cams corresponding to one complete operating cycle of the transfer bar. Crank and bellcrank mechanisms are operatively associated with the transmission of motion from the barrel cams to the transfer bar. In particular, horizontal motion is derived from the horizontal barrel cam by means of plural bellcranks connected together by a drag link. This provides what may be considered as a four-bar parallelogram linkage support of the transfer bar and this type of a support allows the length of the transfer bar to be extended vertically a substantial distance so as to accommodate increased vertical height. In other words, the only adaptation that is required to a machine of the invention in many instances is simply to increase the length of the transfer bar. This is in contrast to a chain type drive where it is necessary to reposition sprockets and to increase the length of the chains; a task which is considerably more difficult than is the case with the present invention.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
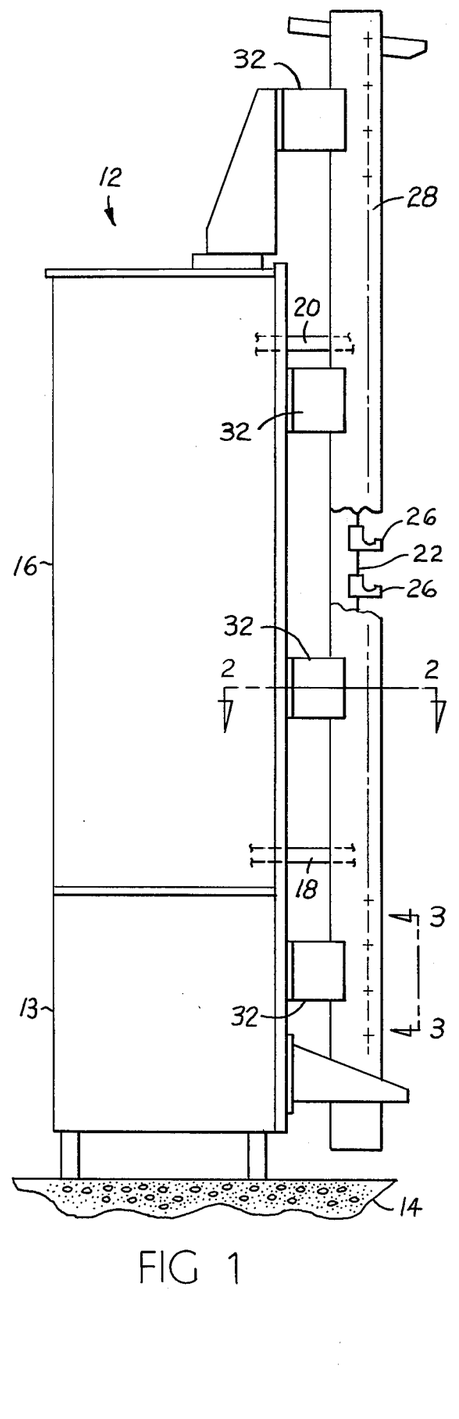
FIG. 1 is a side elevational view having portions removed of a vertical transfer device embodying principles of the present invention.
Figure 2:
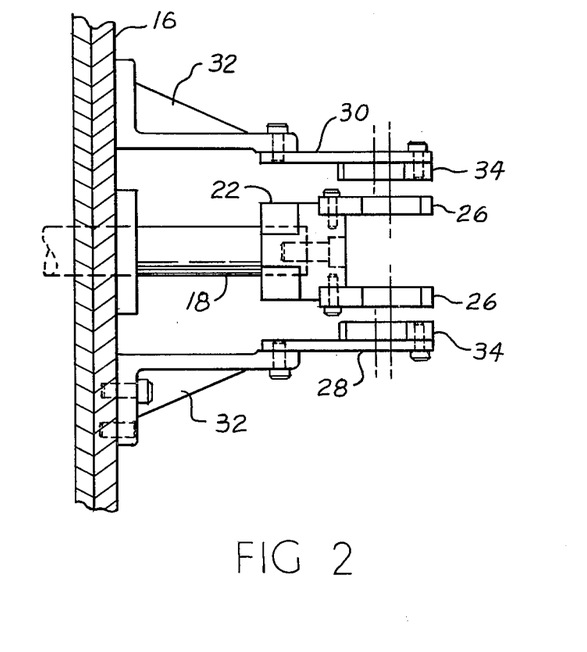
FIG. 2 is a horizontal cross-sectional view taken substantially in the direction of arrows 2—2 in FIG. 1 and enlarged.
Figure 3:
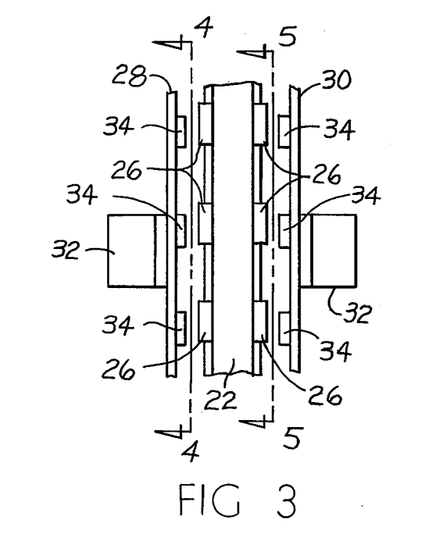
FIG. 3 is a front fragmentary view taken substantially in the direction of arrows 3—3 in FIG. 1 and enlarged.
Figure 4:
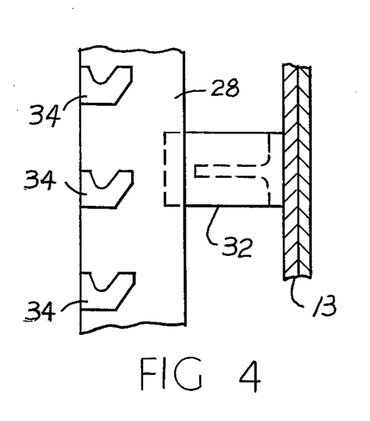
FIG. 4 is a fragmentary view taken substantially in the direction of arrows 4—4 in FIG. 3.
Figure 5:
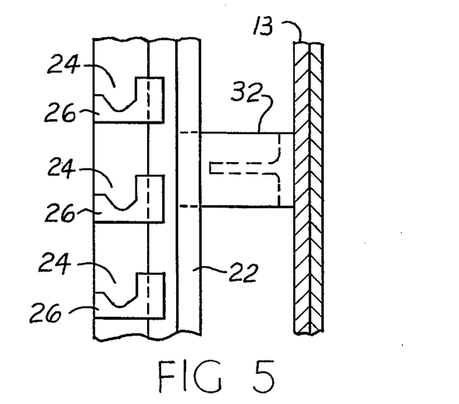
FIG. 5 is a fragmentary view taken substantially in the direction of arrows 5—5 in FIG. 3.

FIG. 1 illustrates a transfer device 12 embodying principles of the present invention. The transfer device comprises a base 13 via which the device mounts on a floor 14. Base 13 supports a drive unit 16. A pair of horizontally disposed members 18 and 20, respectively, project outwardly of drive unit 16. A vertically disposed transfer bar 22 is connected to the ends of members 18 and 20. As can be seen in FIGS. 3 and 5, the transfer bar 22 comprises work-holding receptacles 24 at uniform vertical spacings. The receptacles extend along the full length of the transfer bar from bottom to top as seen in FIG. 1. Each work-holding receptacle is defined by a pair of cradle-like members 26 which are symmetrically arranged on opposite lateral sides of transfer bar 22.

Adjacent each lateral side of the transfer bar is a vertical member 28 and 30, respectively. The vertical members 28 and 30 mount on drive 16 and base 13 by means of a plurality of brackets 32 at appropriate vertical locations. The brackets thereby support the members 30 and 28 fixedly on base 13. Mounted on the laterally inner face of each member 28 and 30, toward the transfer bar, is a receptacle member 34. Each receptacle member 34 on one of the vertical members 28, 30 is in alignment with a corresponding receptacle member 34 on the opposite member 28, 30. In this way, each pair of members 34 forms a station on which a workpiece may be supported. The particular workpieces which are transferred with the illustrated transfer device 12 have generally cylindrical shapes. During operation, the workpieces are supported on the members 34 while the transfer bar retracts and are supported by work holders 26 during transfer advance.

Figure 6:
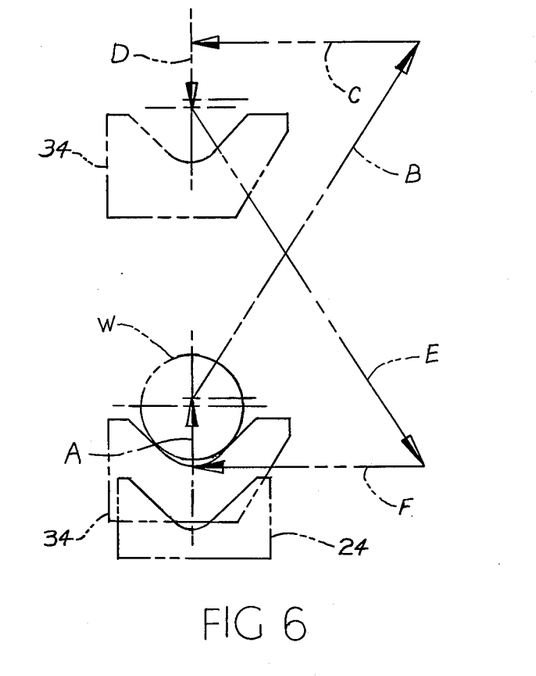
FIG. 6 is a diagrammatic view illustrating the transfer motion of the device shown in FIGS. 1 through 5 which show the device at the junction of arrows A and F.

The details of the drive 16 can be better understood if the motion diagram of transfer bar 22 is first explained. Attention is therefore directed to FIG. 6 which illustrates the motion diagram. FIG. 6 illustrates the motion which occurs when a workpiece W is transferred from one station 34 upwardly to the next station 34. The drawing figure shows the workpiece W in the lower station 34. The corresponding transfer bar work holder 24 is poised in vertical alignment with workpiece W directly below the workpiece. The first motion of the transfer bar is a vertical advance indicated by the arrow A which is of a distance which is effective to cause the work holder 24 to engage the workpiece W and lift the wrokpiece from the station 34.

After having been lifted from the staion, the workpiece is transferred in a diagonal path indicated by the arrow B. The amount of vertical elevation of the workpiece from the receptacle 34 is sufficient so that the workpiece is clear of station 34 during travel along path B. The motion along path B is a straight line motion which comprises a horizontal component and a vertical component. The components are selected such that both work holder 24 and workpiece W clear the next station 34 during the transfer. Furthermore, the vertical component is sufficient that at conclusion of path B the workpiece is vertically spaced above the next station 34 so as to clear the station during the next motion which is the horizontal transfer stroke indicated by the arrow C.

The horizontal transfer stroke C includes no vertical component of motion and brings the workpiece directly over the next station 34.

The component of motion indicated by the arrow D is next executed. This is a vertical downward component of motion which is sufficient to place the workpiece on the station 34 and to continue to move the transfer bar work holder vertically downwardly an amount sufficient to clear the workpiece during the return or retraction stroke.

The return stroke is indicated by the arrow E and is in a diagonal sense. The stroke E brings the work holder 24 to a position vertically clear of the workpieces on stations 34. The vertical component of motion along path E is such that the transfer bar work holder 24 is disposed at a level vertically below the next workpiece which has been deposited on the lower station 34 at the same time that the workpiece W was deposited on the upper station as just explained.

At completion of motion E, a horizontal component of motion, arrow F, is executed to bring the transfer bar work holder back into vertical alignment with the new workpiece W. At the conclusion of stroke F, the transfer bar work holder is in vertical alignment with the new workpiece so as to be poised to pick up that workpiece during the initial upward component of motion of the next cycle. This therefore explains the operating cycle of the transfer where the direction of advance is upwardly. The drive repeatedly executes this cycle to advance the workpieces upwardly one station per cycle.

One advantage of the present invention is that the transfer device is capable of bi-directional transfer meaning either upwardly or downwardly. Downward motion is effected simply by reversing the drive. In this instance, an operating cycle is described for moving a workpiece from the upper station 34 of FIG. 6 to the lower station 34 of FIG. 6. The motion for this type of transfer is along exactly the same path as for an upward advance but in exactly the opposite direction. The starting point is at the junction of arrows D and E.

Thus, the initial motion is a vertical upward component of motion in the opposite direction of arrow D. This elevates the workpiece lifting it from the station 34. The next motion is a horizontal component of motion in the opposite direction of arrow C which clears the workpiece of the stations 34.

The next component of motion is in the opposite direction of arrow B to bring the workpiece directly over the lower station 34. The next motion is in the opposite direction of arrow A depositing the workpiece on the lower station and bringing the transfer bar work holder to a point where it is clear of the just deposited workpiece. The next motion is horizontal in the opposite direction of arrow F. This clears the transfer bar work holder of the workpieces and stations 34. The next motion is in the direction opposite arrow E to return the transfer bar and work holder to a point where the work holder is poised to pick up a new workpiece which was transferred to the upper station 34 at the same time that the workpiece was transferred to the lower station 34 of FIG. 6. The drive repeatedly executes this operating cycle to successively and progressively transfer the workpieces downwardly one station per cycle.

As explained earlier, this motion is imparted to the transfer bar via the horizontal members 18, 20. Hence, the horizontal members execute exactly the same type of motion as the transfer bar. It is therefore now appropriate to consider the details of the drive mechanism by which this motion is generated and reference is made to FIGS. 7 through 11.

The drive has a generally rectangular overall configuration comprising a bottom wall 38, a top wall 40, and side walls 36, 42, 44 and 46. A longitudinal slot 48 is provided in the side wall 46 member 18, 20 extend through slot 48 from the inside of the drive to support the transfer bar. The illustrated construction has circular cross sections for members 18, 20.

The internal construction of the work transfer device comprises a drive shaft 60 which is arranged vertically within the unit. The left hand end of drive shaft 60, as viewed in FIG. 7, (i.e. the lower end) is suitably journaled on the bottom wall 38. The right hand end of the drive shaft (i.e. the upper end) is suitably journaled on a support plate 61 located toward the middle of the unit.

Affixed to drive shaft 60 are a pair of barrel cams 64 and 66 respectively. Barrel cam 64 is located adjacent support plate 61 while barrel cam 66 is adjacent wall 38. As will become more apparent, barrel cam 64 controls the vertical motion of the transfer bar while barrel cam 66 controls the horizontal motion. They will be referred to as the vertical cam and the horizontal cam respectively.

Drive shaft 60 and the two cams are driven by means of a drive designated generally by the reference numeral 62. The drive is located within the unit toward the right hand end as viewed in FIG. 7. The specific drive 62 comprises a variable speed motor 62a and a reducing mechanism 62b. Reducing mechanism includes an ouput shaft 62c. This output shaft is coupled through an overload disconnect device 63 to drive shaft 60. Under usual operating conditions, the overload disconnect device provides a direct coupling of output shaft 62c to drive shaft 60. This means that when motor 62 operates, shaft 60 and the two cams 64 and 66 rotate. The reducing mechanism 62b provides a suitable gear reduction for driving the cams at a suitable speed for operating the transfer bar. If an overload condition is encountered, the overload disconnect device 63 is effective to disconnect the drive from the drive shaft thereby avoiding damage to the reducer and drive motor.

The vertical cam comprises an endless grooved cam 68 which is profiled to produce the desired vertical motion of the transfer bar in accordance with the motion diagram of FIG. 6. The horizontal cam has an endless grooved cam 70 which is profiled to produce the desired horizontal motion.

Figure 7:
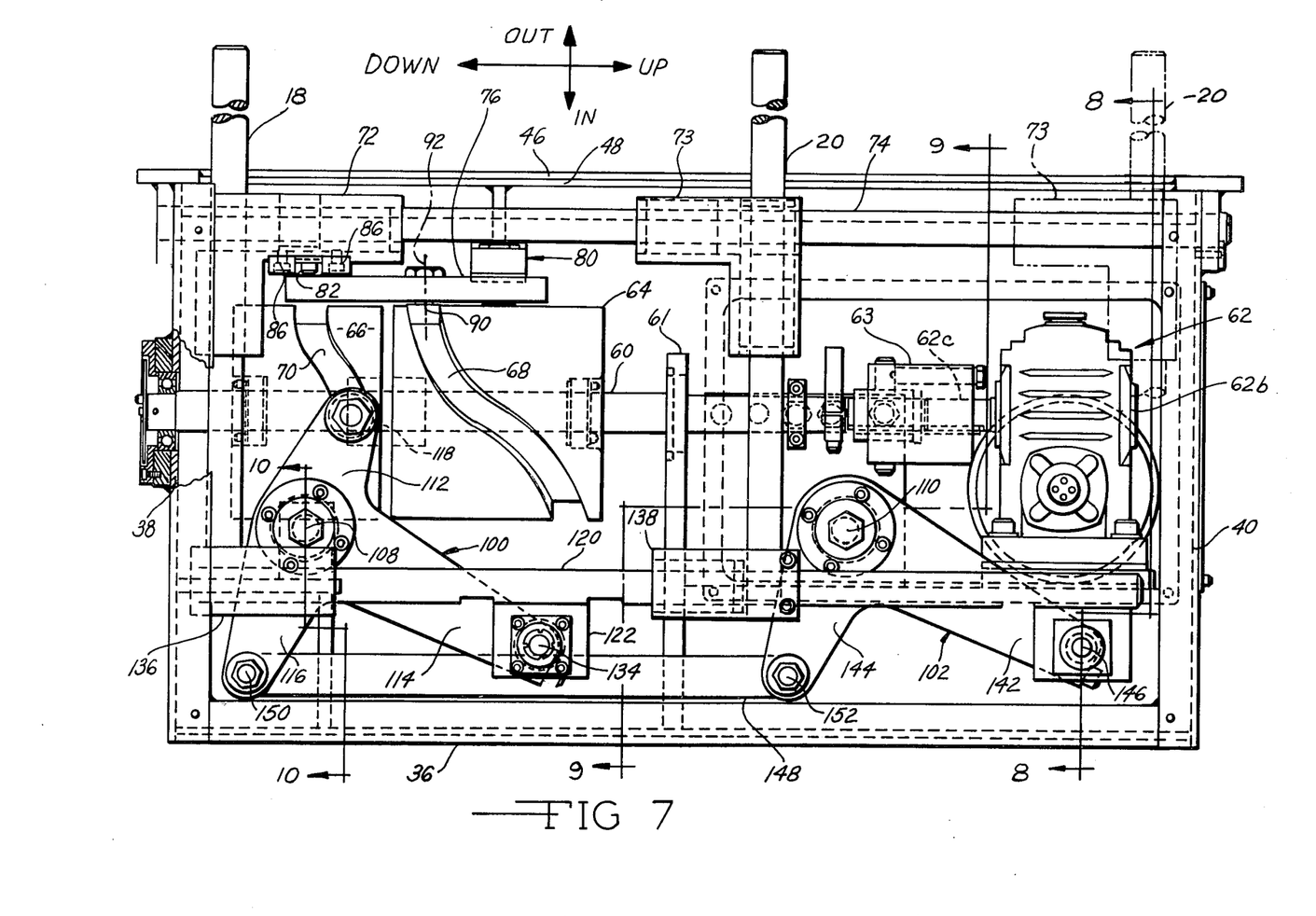
FIG. 7 is a side view of the internal mechanism of the drive for the device.

The cylindrical members 18, 20 are suitably journaled for horizontal shifting. The left hand member 18 as viewed in FIG. 7 is journaled on a carriage 72 within the drive while the right hand member 20 is journaled on a carriage 73. Both carriages 72, 73 are in turn shiftable in the vertical direction along a common circular cylindrical guide rod 74 which extends vertically between walls 38 and 40. The guide rod is located laterally within the unit between the barrel cams and the wall 42.

Figure 8:
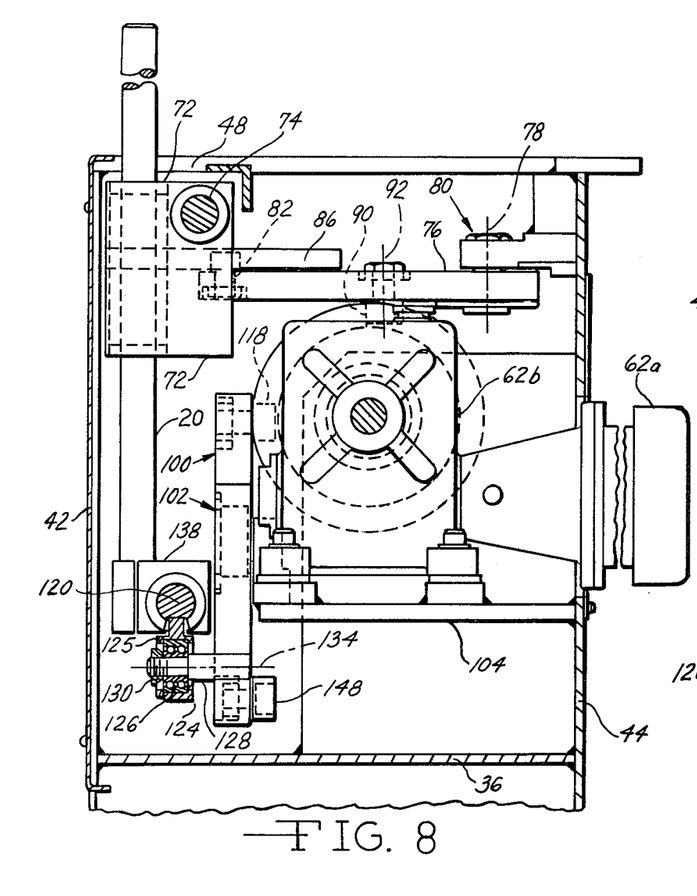
FIG. 8 is a sectional view taken in the direction of arrows 8—8 in FIG. 7.
Figures 9, 10:
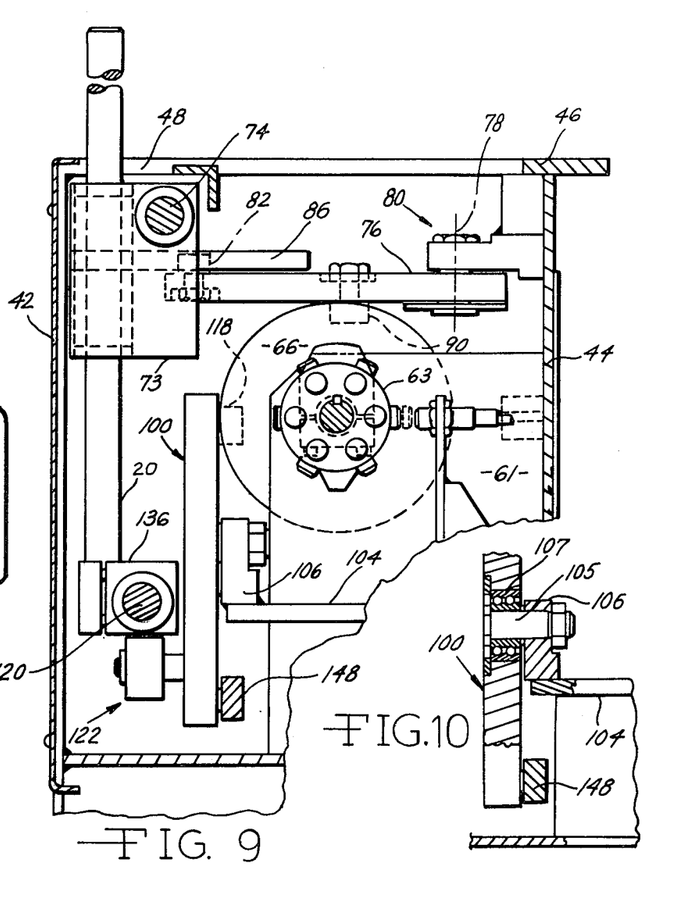
FIG. 9 is a sectional veiw taken in the direction of arrows 9—9 in FIG. 7.
FIG. 10 is a sectional view taken in the direction of arrows 10—10 in FIG. 7.

Vertical motion for shifting carriages 72, 73 on guide rod 74 is imparted from vertical cam 64 by means of a lever arm 76 which is located just inside wall 46. Lever arm 76 is pivotally mounted at one end about a horizontal pivot axis 78. For this purpose, the lever arm is pivoted on a suitable pivot joint 80 which is secured to the wall 44 as can be seen in FIGS. 8 and 9. The opposite end of lever arm 76 is operatively connected with carriage 72 by means of a roller and track connection.

For this purpose, a circular roller 82 is mounted on the lever arm. A track 84 is defined on the side of carriage 72 by a pair of longitudinally spaced parallel members 86 secured to the carriage. As can be seen in FIGS. 8 and 9 the members 86 project laterally of the carriage toward the wall 44. Roller 82 is free to rotate about a horizontal axis 88 and fits closely within the track. If lever arm 76 is caused to swing about axis 78 in the direction of the arrow 87 in FIG. 11, there occurs a corresponding shifting of the carriage 72 along guide 74, roller 82 traveling within track 84 during the stroking. This shifting is also imparted to member 20 by transfer bar 22 tying the two members 18, 20 together so that the vertical shifting motion imparted to carriage 72 and member 18 by the lever arm 76 is also imparted to carriage 73 via member 20. Hence, the vertical stroke involves both carriages 72 and 73 shifting in unison.

Figure 11:
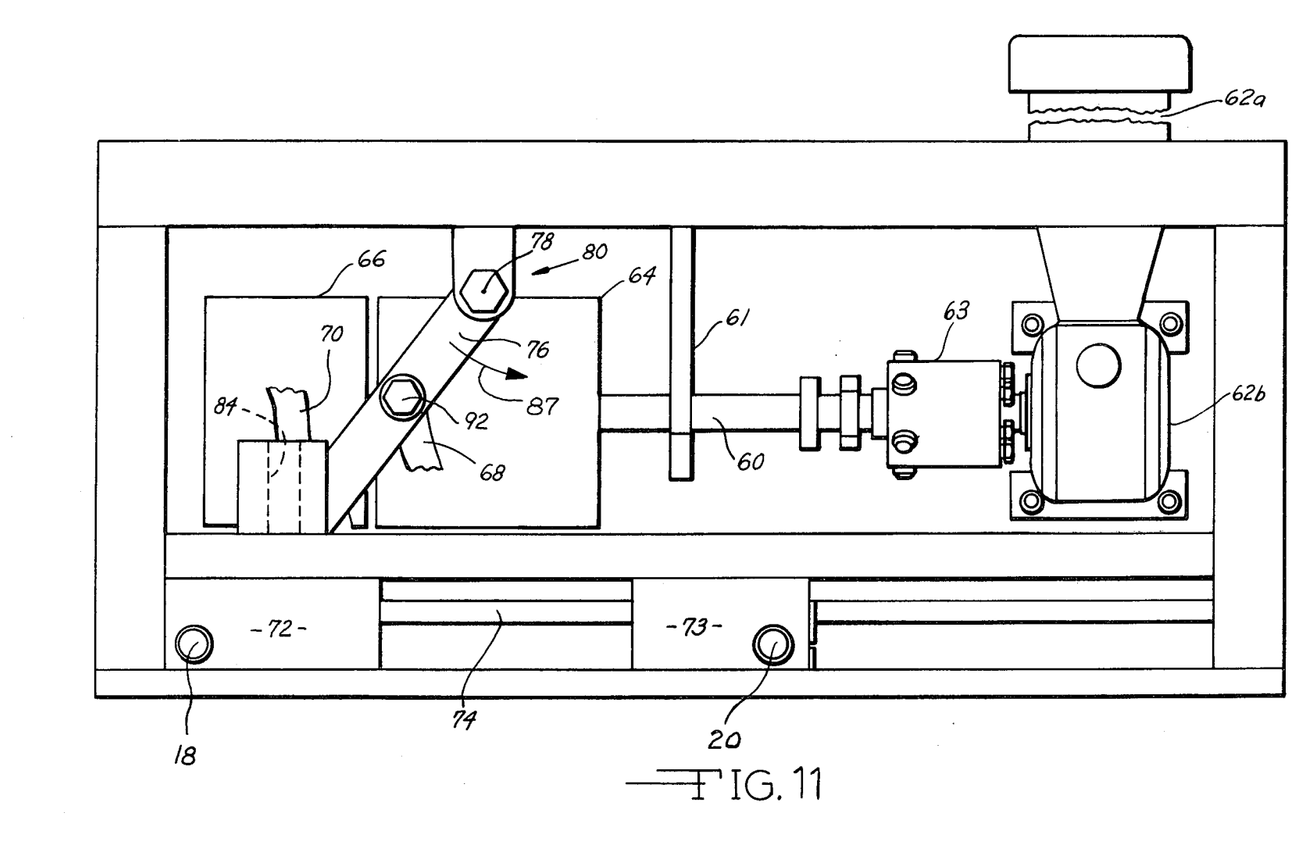
FIG. 11 is a sectional view taken in the direction of arrows 11—11 in FIG. 7.

Lever arm 76 is operated via a cam follower 90 operatively coupling cam 64 with the lever arm. Follower 90 is mounted on lever arm 76 between pivot joint 80 and carriage 72. The follower comprises a roller which is free to rotate on the lever arm about a horizontal axis 92. The roller rides in the cam groove. Hence, as cam 64 rotates the profile of the cam groove is tracked by follower 90 to impart a pivotal motion to the lever arm about axis 78. The pivotal motion imparted to the lever via the follower causes carriages 72 and 73 to be correspondingly shifted along guide rod 74. Motion of the lever arm 76 is such that the vertical upward stroke of the transfer bar is caused by the lever arm swinging from left to right as viewed in FIG. 11. FIG. 11 illustrates the carriages and the transfer bar in the lower vertical position. The arrangement is such that there is a multiplication of the throw, or profile, of the cam groove whereby the carriages are shifted a distance greater than the actual profile of the cam groove. The cam groove has a profile which will create the desired vertical components of motion of the transfer bar in accordance with the motion diagram of FIG. 6.

The transfer device includes additional mechanism for coupling horizontal cam 66 to the transfer bar for imparting horizontal components of motion. This mechanism comprises a pair of cranks 100, 102. A ledge 104 (FIGS. 8 and 9) is supported within the drive on a sidewall. Blocks 106 mount on ledge 104 at spaced locations along the free edge of the ledge as viewed in FIGS. 8 and 9. Each crank 100, 102 is supported on a corresponding one of the blocks so that it can pivot about a horizontal axis. The axis about which crank 100 pivots is designated by the reference numeral 108 while that for crank 102 is designated by the reference numeral 110.

FIG. 10 illustrates detail of the pivot joint. A pin 105 is attached to block 106 and projects horizontally. A bearing assembly 107 supports the crank on the pin. Preferably, the bearing assembly is of the type comprising a double row of balls.

Crank 100 comprises three crank arms 112, 114, 116. Crank 112 has a circular roller 118 at its distal end which fits in groove 70 of cam 66. The distal end of arm 114 is connected via a pivot joint with a cylindrical guide rod 120 of circular cross section. Guide rod 120 is arranged vertically and is parallel to guide rod 74 and hence parallel to the direction of carriage travel.

The particular construction for the pivot joint connection from crank arm 114 to guide rod 120 comprises a generally rectangular bearing block 122 which is secured to guide rod 120. Guide rod 120 is machined locally on one side to provide a slot in which the bearing block 122 is fitted. The bearing block is secured to the guide rod by suitable attaching means such as screws. As best seen in FIG. 8, the bearing block comprises a main body 124 in which a bearing assembly 126 is located. The bearing assembly is retained by means of a retainer 125. The bearing 126 is of the type which comprises a double row of spherical bearing balls which are contained between inner and outer annular members. A pin 128 affixed to crank arm 114 projects horizontally from the crank arm and passes through bearing assembly 126. A nut 130 is attached the the threaded shank of the pin to complete the coupling. With this arrangement the crank arm can pivot freely about the horizontal pivot axis 134.

Engaging guide rod 120 are a pair of vertically spaced slides 136, 138 respectively. The end of member 18 is secured to slide 136 while member 20 is secured to slide 138. Therefore, the slides are shiftable along guide rod 120 in unison with the shifting of the carriages.

Crank arm 102 is pivoted on the corresponding block 104 in the same manner as crank arm 100 on its block 104. The crank arm 102 has a pair of arms 142, 144 which are angularly related to each other in the same manner as are crank arms 114, 116 of crank 100. The distal end of crank arm 142 is operably connected with guide rod 120 by the same type of pivot arrangement as crank arm 114 was coupled to the guide rod. Hence, the crank arm 142 is pivotable with respect to the guide rod about a horizontal transverse pivot axis 146.

The distal ends of crank arms 116, 144 are connected together by means of a drag link 148. The connections of the crank arms to the drag link provide for relative pivotal movement about horizontal pivot axes 150, 152 respectively.

With the arrangement, rotation of horizontal cam 66 rocks crank arm 100 about axis 108. The connection provided by drag link 148 acting between the crank arms 116 and 114 causes crank 102 to rock in unison with crank 100. While the respective crank arms swing along circular arcs, the geometric relationships are such that crank arm 112 experiences a predominantly vertical component of motion as cam 66 rotates. This vertical component of motion is translated into corresponding horizontal motion of crank arms 114, 142. Accordingly, guide rod 120 is bodily displaced horizontally in accordance with operation of the two cranks to impart horizontal motion to the transfer bar via members 18, 20. The cam groove 70 is suitably profiled to generate the proper rocking action of the cranks so that the transfer bar is horizontally shifted at the proper times in the motion cycle.

It will be observed that the guide rod 120 experiences only a limited vertical component of motion while being horizontally shifted. Accordingly, this means that the overall height of the drive is essentially determined by the vertical stroke considerations. Another advantage is that the double crank arrangement, which is in the nature of a four-bar parallelogram linkage, enhances accuracy and weight carrying capacity because support is provided at two vertically spaced locations. This means that the same drive can be used for different overall transfer heights simply by increasing the height of the transfer bar and extending the number of stations 34. Very great transfer heights could be achieved by inclusion of additional horizontal members, such as 18 and 20, connected to the transfer bar and each being mounted on a vertical slide and horizontally shiftable by a further bellcrank connected to the other bellcranks by an extension of the drag link. Accordingly, the invention exhibits marked advantages over other types of vertical transfer devices.

The actual velocity of motion which is imparted to the transfer bar in both horizontal and vertical directions is a function of the detailed construction of the mechanism and particularly of the profiles of the respective cams and the drive speed. The cams may be designed in accordance with conventional techniques to impart desired velocities to parts of the mechanism during transfer. It may be desirable to provide profiles which cause minimum accelerations and decelerations during engagement and releasing of the work pieces. Such features can be incorporated using conventional design practices.

While a preferred embodiment has been disclosed, it will be appreciated that principles of the invention, as set forth in the following claims, are applicable to other embodiments.

What is claimed is:

1. A work transfer device for vertically transferring workpieces comprising a series of vertically spaced stations supported on a base, a vertically disposed transfer bar having work holders thereon at successive vertically spaced locations whose vertical spacing corresponds to the vertical spacing of said stations, a drive supported on the base and operatively coupled with said transfer bar for causing the transfer bar to repeatedly execute an operating cycle wherein the workpieces are vertically advanced one station per cycle, said drive comprising means for causing each operating cycle to comprise (1) an initial vertical upward component of motion wherein the work holders on the transfer bar lift the workpieces off the stations followed by, (2) a first horizontal component of motion to vertically clear the workpieces of the stations and (3) a second horizontal component of motion to vertically realign the workpieces with the stations including (4) during the time between the beginning of the first horizontal component of motion and the end of the second horizontal component of motion a vertical component of motion which vertically advances the workpieces so that at the end of the second component of motion the workpieces are directly over their next stations followed by, (5) a downward vertical component of motion wherein the workpieces are deposited on these next stations, followed by, (6) a third horizontal component of motion to vertically clear the transfer bar work holders of the workpieces and (7) a fourth horizontal component of motion to vertically realign the transfer bar work holders with the workpieces including (8) during the time between the beginning of the third horizontal component of motion and the end of the fourth horizontal component of motion a vertical component of motion which vertically retracts the transfer bar so that at the end of the fourth horizontal component of motion the transfer bar is in position where it is poised to begin the initial vertical upward component of motion of the next operating cycle, said drive comprising two independent control means each providing control of a respective one of said vertical and horizontal motions, said two independent control means being operated in predetermined relationship during each operating cycle.

2. A work transfer device as set forth in claim 1 wherein the direction of advance is up.

3. A work transfer device as set forth in claim 2 wherein the vertical component of motion which occurs between the beginning of the first horizontal component of motion and the end of the second horizontal component of motion is executed concurrently with the first horizontal component of motion.

4. A work transfer device as set forth in claim 3 wherein there is no vertical motion during execution of the second horizontal component of motion.

5. The improvement set forth in claim 3 in which the first horizontal component of motion and the vertical component of motion which is executed concurrently with the first horizontal component of motion have a resultant motion which is in a straight line.

6. A work transfer device as set forth in claim 2 wherein the vertical component of motion which occurs between the beginning of the third horizontal component of motion and the end of the fourth horizontal component of motion is executed concurrently with the third horizontal component of motion.

7. A work transfer device as set forth in claim 6 wherein there is no vertical motion during execution of the fourth horizontal component of motion.

8. A work transfer device as set forth in claim 1 wherein the direction of advance is down.

9. A work tranfer device as set forth in claim 8 wherein the vertical component of motion which occurs between the beginning of the first horizontal component of motion and the end of the second horizontal component of motion is executed concurrently with the second horizontal component of motion.

10. A work transfer device as set forth in claim 9 wherein there is no vertical motion during execution of the first horizontal component of motion.

11. A work transfer device as set forth in claim 9 wherein the second horizontal component of motion and the vertical component of motion which occurs between the beginning of the first horizontal component of motion and the end of the second horizontal component of motion have a resultant motion which is in a straight line.

12. A work transfer device as set forth in claim 8 wherein the vertical motion which occurs between the beginning of the third horizontal component of motion and the end of the fourth horizontal component of motion is executed concurrently with the fourth horizontal component of motion.

13. A work transfer device as set forth in claim 12 wherein no vertical motion occurs during execution of the third horizontal component of motion.

14. A work transfer device as set forth in claim 1 wherein the vertical component of motion which occurs between the beginning of the first horizontal component of motion and the end of the second horizontal component of motion is executed concurrently with only one of said first and second horizontal components of motion and wherein the vertical component of motion which occurs between the beginning of the third horizontal component of motion and the end of the fourth horizontal component of motion occurs concurrently with only one of said third and fourth horizontal components of motion.

15. A work transfer device as set forth in claim 1 wherein said stations comprise vertically spaced cradles for supporting the workpieces and the transfer bar work holders comprise cradles for supporting the workpieces during transfer.

16. A work transfer device as set forth in claim 14 in which the station cradles are provided on horizontally spaced vertically extending members and the transfer bar and the transfer bar cradles are disposed between said vertically extending members.

17. A work transfer device as set forth in claim 16 wherein the drive is disposed adjacent said vertical members.

18. A work transfer device as set forth in claim 15 wherein the drive is disposed adjacent the transfer bar and wherein two or more of horizontally disposed members extend from the drive and are connected to the transfer bar at vertically spaced locations and wherein the drive comprises means for imparting motion to at least one of said horizontally disposed members corresponding to the motion of the operating cycle.

19. A work transfer device for vertically transferring workpieces comprising a series of vertically spaced stations supported on a base, a vertically disposed transfer bar having work holders thereon at successive vertically spaced locations whose vertical spacing corresponds to the vertical spacing of said stations, a drive supported on the base and operatively coupled with said transfer bar for causing the transfer bar to repeatedly execute an operating cycle wherein the workpieces are vertically advanced one station per cycle, said drive comprising means for causing each operating cycle to comprise (1) an initial vertical upward component of motion wherein the work holders on the transfer bar lift the workpieces off the stations followed by, (2) a first horizontal component of motion to vertically clear the workpieces of the stations and (3) a second horizontal component of motion to vertically realign the workpieces with the stations including (4) during the time between the beginning of the first horizontal component of motion and the end of the second horizontal component of motion a vertical component of motion which vertically advances the workpieces so that at the end of the second component of motion the workpieces are directly over their next stations followed by, (5) a downward vertical component of motion wherein the workpieces are deposited on these next stations, followed by, (6) a third horizontal component of motion to vertically clear the transfer bar work holders of the workpieces and (7) a fourth horizontal component of motion to vertically realign the transfer bar work holders with the workpieces including (8) during the time between the beginnining of the third horizontal component of motion and the end of the fourth horizontal component of motion a vertical component of motion which vertically retracts the transfer bar so that at the end of the fourth horizontal component of motion the transfer bar is in position where it is poised to begin the initial vertical upward component of motion of the next operating cycle and wherein said stations comprise vertically spaced cradles for supporting the workpieces and the transfer bar work holders comprise cradles for supporting the workpieces during transfer, the drive is disposed adjacent the transfer bar and wherein two or more of horizontally disposed members extend from the drive and are connected to the transfer bar at vertically spaced locations and wherein the drive comprises means for imparting motion to at least one of said horizontally disposed members corresponding to the motion of the operating cycle, and in which the drive comprises a vertical guide means, carriage means vertically shiftable on said guide means, means supporting said horizontally disposed members on said carriage means and motive means for imparting horizontal motion to the transfer bar by shifting at least one of said horizontally disposed members on said carriage means and vertical motion by shifting said carriage means on said guide means.

20. A work transfer device as set forth in claim 19 wherein said motive means comprises a pair of barrel cams on a common shaft driven in unison by a source of power, one of said cams being operatively coupled with the carriage means for vertically shifting the carriage means and the other cam being operatively coupled with said at least one horizontally disposed member for shifting said at least one horizontally disposed member on said carriage means.

21. A work transfer device as set forth in claim 20 wherein the axis of rotation of said cams is vertical.

22. A work transfer device as set forth in claim 19 wherein the means for imparting motion to the transfer bar comprises, for imparting horizontal motion, a further vertical guide means spaced horizontally from said first vertical guide means, slide means vertically shiftable on the further guide means, said horizontally disposed members being secured to said slide means, a pair of vertically spaced apart bellcranks, means mounting the bellcranks relative to the base for rotation about respective horizontal pivot axes which are vertically spaced apart, a pair of pivot means secured to the further guide means at vertically spaced locations, each bellcrank having a crank arm connected at the distal end to a corresponding one of the pivot means whereby pivot connection is provided between each crank arm and the corresponding pivot means, each bellcrank comprising a second crank arm, and including a drag link connecting both second crank arms together so that rocking motion of one crank arm about its pivot axis is imparted to the other crank arm, and means operatively coupling the two bellcranks to the motive means for causing the bellcranks to operate in unison to horizontally displace the further vertical guide means and thereby horizontally shift said horizontally disposed members and impart horizontal motion to the transfer bar.

23. A work transfer device as set forth in claim 22 wherein one of said two bellcranks comprises a third crank arm, said third crank arm being operatively coupled to a barrel cam which is driven to impart rocking motion to said bellcranks.

24. A work transfer device as set forth in claim 23 in which the carriage means comprises a pair of vertically spaced separate carriage members each carriage member comprising a vertical portion which slidably engages the first vertical guide means and a horizontal portion which slidably engages a corresponding one of the horizontally disposed members.

* * * * *